United States Patent [19]

Waring

[11] Patent Number: 5,108,016
[45] Date of Patent: Apr. 28, 1992

[54] FUEL CONTAINER SYSTEM

[76] Inventor: Roy F. Waring, Box 350, Pennsburg, Pa. 18073

[21] Appl. No.: 592,916

[22] Filed: Oct. 4, 1990

[51] Int. Cl.$^5$ .................................................. A47G 19/14
[52] U.S. Cl. ..................................... 222/468; 222/30;
222/158; 222/473; 222/481.5; 222/530;
220/219; 220/459
[58] Field of Search ................... 222/23, 30, 158, 468,
222/473, 481.5, 526, 527, 530; 206/219, 459;
73/426, 427

[56] References Cited

U.S. PATENT DOCUMENTS

| | | | |
|---|---|---|---|
| 60,568 | 12/1886 | Shaffner . | |
| 1,377,577 | 5/1921 | Hanson . | |
| 1,481,359 | 1/1924 | Dye | 222/530 X |
| 2,109,579 | 11/1935 | Paull | 222/530 |
| 2,154,647 | 4/1939 | West | 222/530 X |
| 2,217,396 | 7/1955 | Mowat . | |
| 2,630,247 | 3/1953 | Rafferty | 222/530 X |
| 2,971,673 | 2/1961 | Beck, Jr. | 220/86 |
| 3,258,161 | 6/1966 | Wolven | 222/41 |
| 3,746,200 | 7/1973 | Flider | 222/468 X |
| 3,948,105 | 4/1976 | Johnson | 73/427 |
| 4,069,946 | 1/1978 | Flider | 222/468 X |
| 4,079,629 | 3/1978 | Hope | 73/427 |
| 4,125,207 | 11/1976 | Ernst et al. | 222/530 X |
| 4,135,404 | 1/1979 | Butler, Jr. | 222/158 X |
| 4,230,238 | 10/1980 | Wilson | 222/158 |
| 4,292,846 | 10/1981 | Barnett | 73/427 |
| 4,298,038 | 11/1981 | Jennings | 141/18 |
| 4,416,396 | 11/1983 | Ward | 222/530 X |
| 4,445,370 | 5/1984 | Whitmire | 73/290 |
| 4,480,470 | 11/1984 | Tussing | 222/158 X |
| 4,549,585 | 10/1985 | Emerson | 141/95 |
| 4,721,393 | 1/1988 | Kwast | 366/341 |
| 4,819,833 | 4/1989 | Huddleston et al. | 22/155 |
| 4,860,927 | 8/1989 | Grinde | 158/454 |

FOREIGN PATENT DOCUMENTS 252652 6/1926 United Kingdom ................ 222/530

Primary Examiner—Michael S. Huppert
Assistant Examiner—Kenneth DeRosa
Attorney, Agent, or Firm—Synnestvedt & Lechner

[57] ABSTRACT

A container system for holding and dispensing an oil-gasoline mixture uses a transparent container bearing indicia showing the quantity of liquid in the container, and an oil-measuring cup mounted to the fill cap so as to extend into the container when the cap is on. The cup is also transparent and marked with indicia showing the quantity of oil, or the desired oil-gasoline ratio. With the cap removed, the cup is filled to the desired level and its contents dumped into the container. A dispensing hose extends from a dispensing opening on the container, through which the mixture is dispensed. A special venting system is provided which prevents pressurized product from being vented toward the face of the user, and employs a vent nozzle the atmospheric vent opening of which is blocked by placing the dispensing end of the hose thereon when the system is arranged for storage, and is opened by the user to direct the venting downwardly when the hose is removed to provide dispensing.

5 Claims, 2 Drawing Sheets

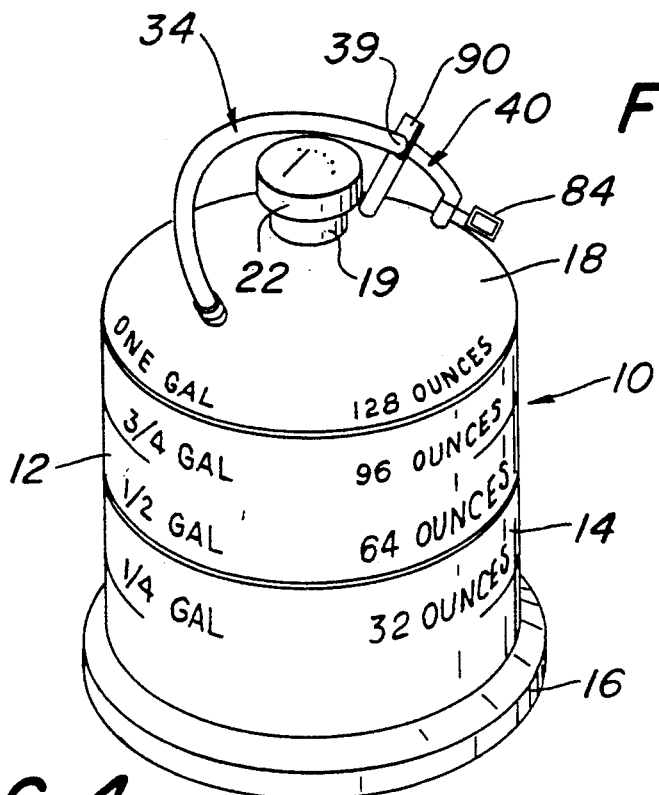
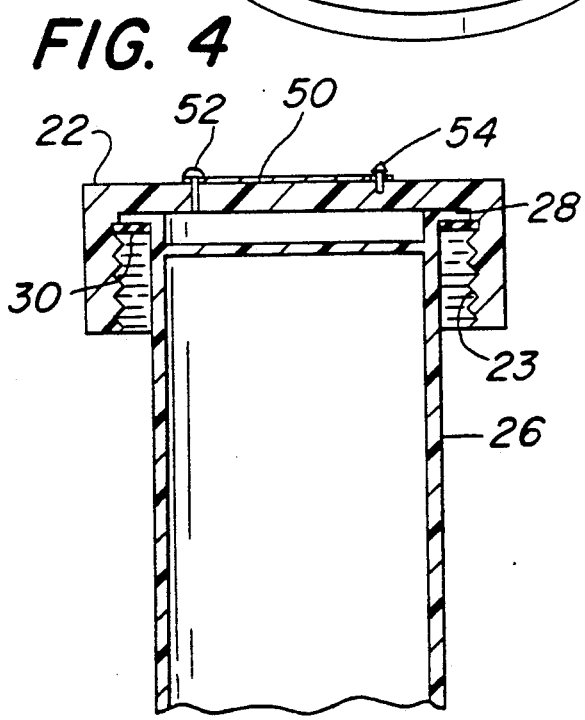
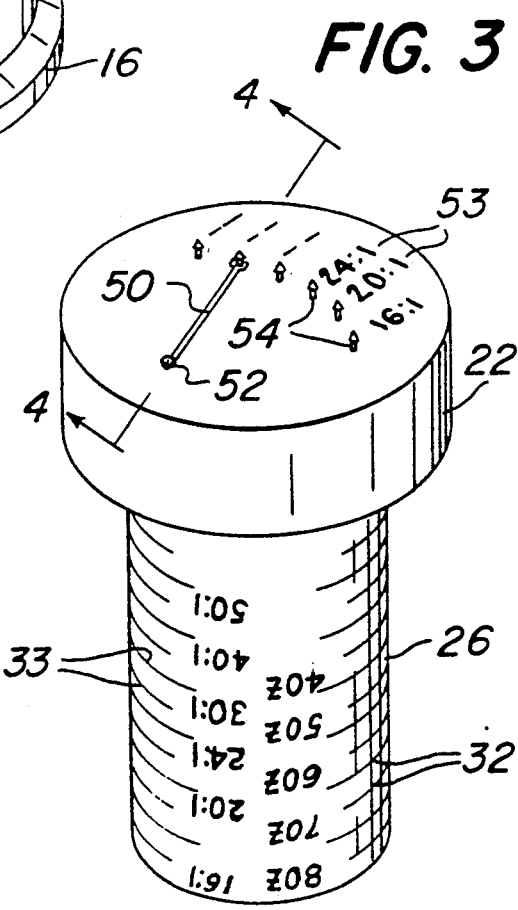

FUEL CONTAINER SYSTEM

FIELD OF THE INVENTION

This invention relates to fuel container systems for containing and dispensing mixtures of gasoline and oil such as are utilized as the fuel in two-cycle engines.

BACKGROUND OF THE INVENTION

Two-cycle engines, such as those used for chain saws, weed wackers, etc., utilize a mixture of oil and gasoline for the fuel, with the oil being a specific percentage of the mixture. Different engines require different mixture ratios, and incorrect mixtures can cause various problems with the engine, such as poor starting, excessive smoking, poor running performance, and engine seizure.

It is therefore important to place into the container for the fuel the proper amount of oil for the amount of gasoline in the container. It is also desirable to provide the desired mixture as easily and safely as possible.

A container for such purposes should have at least one vent opening for the exhaust of pressurized gases when the container is placed in use, which opening is closed to the atmosphere when not in use so as to avoid unnecessary environmental pollution. It is further desirable that the venting arrangement when initially opened will not discharge into the face and eyes of the user.

It is also desirable to be able to provide on the container an indication of the gas-oil ratio of the mixture in the container, so that one may later determine visually what mixture is in that container. It is also advantageous to provide a container which can readily be placed upon relatively uneven terrain, such as grass, without being easily tipped over, and a further desirable feature is to provide a handle for the container which is particularly advantageous in pouring out the contents of the container, and which tends to effect mixing of the gas and oil when carrying the container.

While one or more of these elements of the desired fuel-mixture container system have been provided to at least some degree in prior art devices for similar purposes, it is believed that none have provided the advantageous combination of features described and claimed herein.

SUMMARY OF THE INVENTION

In accordance with the invention, the foregoing objectives are obtained by the provision of a fuel-mixture container system utilizing one or several, and preferably all, of the following features.

The main container is transparent so that the level of the contents can readily be viewed from the exterior, and is provided with indicia extending vertically along its exterior indicating the amount of gasoline in the container. Preferably the bottom of the container is provided with a centrally hollowed-out pedestal, so that when placed upon an uneven support it exhibits stability against tipping.

In normal use, gasoline is poured into the main body of the container through a top fill opening, for example until the level of the gasoline reaches the indicia indicating one gallon of contents. In order to provide the desired amount of oil for the mixture, a fuel cap is provided to close the fill opening sealingly, from which cap a generally cylindrical oil-measuring cup depends and normally extends downwardly within the container; the cup is mounted so that when the cap is removed the cup is also thereby removed from the container so that it can be inverted for use as a measuring cup for the oil. Preferably, the measuring cap is transparent and indicia are provided along its length so that the proper amount of oil can be measured out and dumped into the container. In a preferred embodiment, the indicia may be in terms of quantity and/or in terms of mixture ratio of volume of gas to volume of oil. One merely fills the upwardly turned measuring cup with an amount of oil corresponding to the amount or mixture ratio desired, and dumps the measured oil into the container through the top fill opening, thereafter replacing the cap tightly.

A fuel outlet is also provided near the top of the container, to which one end of a dispensing hose is secured, the other end of the hose serving as the dispensing end through which the mixture is dispensed into the fuel tank of the engine to be supplied with fuel.

A handle is also preferably provided extending obliquely along a top portion of the container, so that when the container is held by the handle it will tend to tilt forwardly and thus assist in the pouring operation; also, because of this angle, the fuel and oil tend to slosh around and be mixed together when the tank is carried by such handle.

It is also important to vent the container so that when it is first opened any fuel or volatile products under pressure may be safely discharged, the vent opening thereafter also serving to provide an inlet for air during the pouring operation to smooth the outward flow of the mixture. In the preferred embodiment, venting is provided through an opening in the top surface of the container which communicates with a vent passage extending through the handle and then outwardly to the atmosphere, by way of a hose-receiving fitting attached to the handle and to which the dispensing end of the hose is connected during storage. When the outlet end of the hose is slipped into position on the fitting, it blocks communication between the vent passage and atmosphere, the entire system is sealed, and no product is released to pollute the atmosphere. However, as soon as the hose is removed from the fitting, a vent to atmosphere is provided by the uncovered passage in the hose fitting. Preferably, the vent passage extends downwardly in the hose fitting so as to exit from the lower side of the hose fitting, whereby initial atmospheric venting is directed primarily downwardly, away from the face and eyes of the user, which are normally well above the container, thus protecting the user.

Also in the preferred environment, movement of the outlet end of the hose along the hose fitting past its atomspheric venting position is provided by a hose release member pivotally secured to the handle adjacent to the fitting, movable by the thumb of the user to push the hose along the vent fitting past the atmospheric venting position, thereby enabling venting of the container for use by manipulation with only one hand, i.e. the same hand which is used to carry the container by its handle.

In order to provide a continued indication of the ratio of gasoline to oil in the container, the top of the fuel cap is preferably provided with an adjustable indicator which the user can set to show the ratio of gasoline to oil in the mixture in the can after the oil is added to the water, thus providing continual indication of the mixture during and after later prolonged storage of the container. Preferably also, an information tag may be secured to the container, for example by a chain extending around the handle, on which tag one can keep a record of the contents of the container.

There is thereby provided a container system for gas-oil mixtures in which the desired mixture is readily and easily produced, in which the container is stable against tipping, in which venting is provided only during use, in which initial venting is directed downwardly away from the face of the user, and in which initiation of venting is accomplished by easy manipulation of the thumb of the same hand as that in which the container is carried. Use of a transparent container and fuel cap makes possible easy ascertainment of the amount of gasoline placed into the container and of the amount of oil placed in the cap prior to mixture with the gasoline, and an adjustable indicator provides indication of mixture ratio during storage.

BRIEF DESCRIPTION OF FIGURES

These and other objects and features of the invention will be more readily understood from a consideration of the following detailed description, taken in connection with the accompanying drawings, in which:

FIG. 1 is a perspective view of a container system in accordance with the present invention;

FIG. 3 is an enlarged perspective view of the assembly of the fill cap and oil-measuring cup;

FIG. 4 is an enlarged, fragmentary, vertical sectional view of the cap and cup of FIG. 3, taken along lines 4—4 of FIG. 3;

DESCRIPTION OF THE PREFERRED EMBODIMENT

Figure 2:
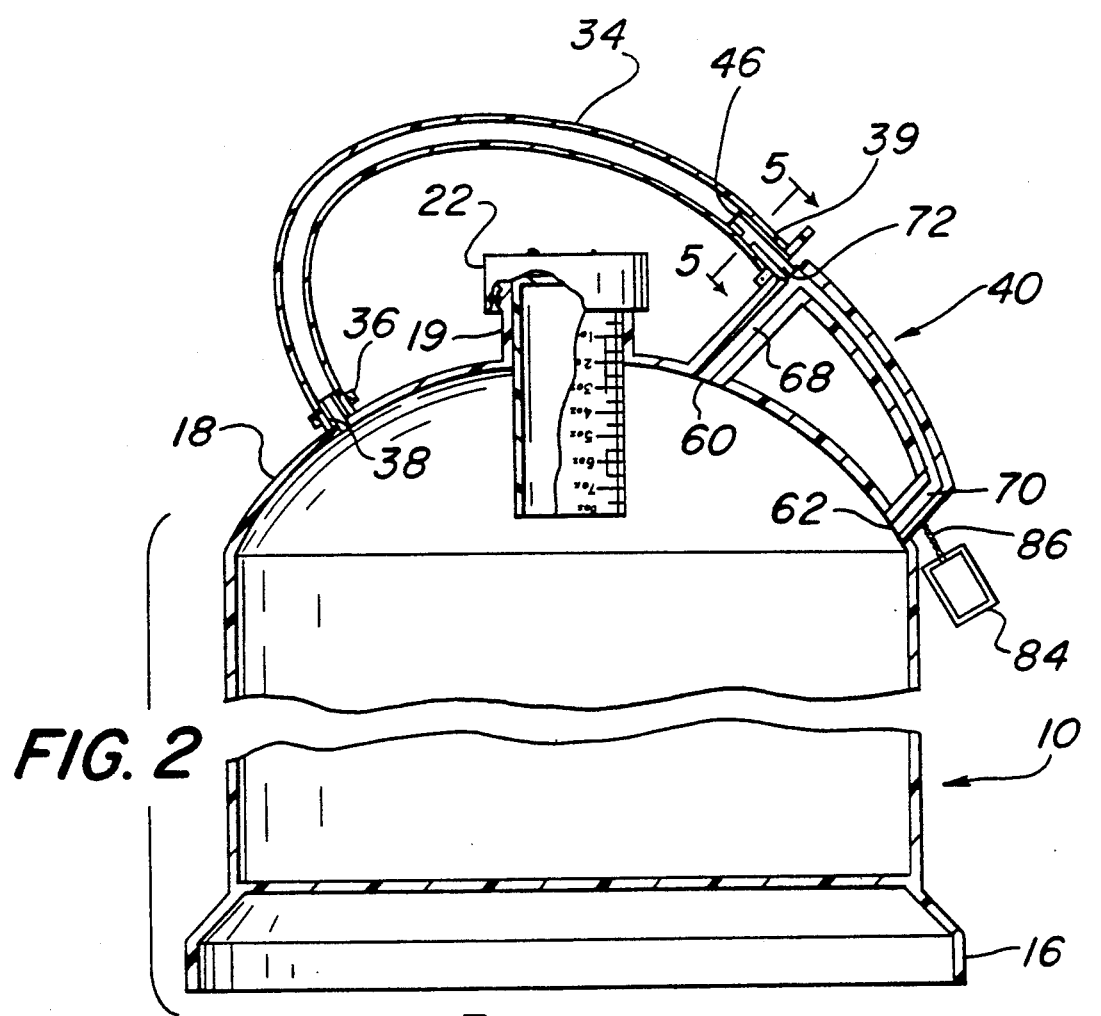
FIG. 2 is a vertical sectional view through the container system of FIG. 1.

Referring now to the example of the invention shown by way of example only, and without thereby in any way limiting the scope of the invention, FIG. 1 shows a main fuel-mixture container 10 made of a transparent plastic material and having graduations indicating the level of the contents therein; in column 12 this is in terms of the gallons of gasoline contained therein, and in the other column 14 it is in terms of the number of ounces of gasoline contained in it.

The bottom of the container is provided with a centrally hollow pedestal 16, which facilitates stable resting of the container on an uneven surface, for example on grass. The top 18 of the container is domed in this example, and is provided with a stub cylinder 19 forming at its top a central fill opening and to which a fill cap 22 is normally screwed by appropriate threads 23 (FIG. 4). As shown particularly clearly in FIGS. 3 and 4, a measuring cup 26 is mounted in the fill opening and against the inner side of the cap, by means of a circular flange 28 on the cup which fits closely within the cap and a resilient ring 30 which provides a vapor seal and serves to hold the cup to the cap when the cap is removed. Graduations 32 are provided along the transparent cup to indicate the quantity of oil in it as it is filled. Graduations 33 are also preferably provided which indicate the levels of filling of the cup corresponding to various ratios of gasoline to oil, assuming the container has been filled with one gallon of gasoline.

A flexible dispensing hose 34 is also provided, one end of which is held by clamp 36 (FIG. 2) in position on an outlet fitting 38 provided on the top of the container; the other end 39 of the hose is normally used to dispense the fuel mixture into an engine tank, by placing the dispensing end 39 of the hose into the tank fill opening and tilting the container appropriately. An angled handle 40 is also secured to the top of the container and extends at an angle to the vertical; this facilitates pouring, due to the angle at which the container tends to hang when held by the handle, and also tends to facilitate a mixing of the oil and gasoline in the container when it is carried.

The outlet or dispensing end 39 of the hose 34 is, in the normal stored position of the container, slipped over the hose-end receiving fitting 46 (FIG. 6) which is screwed into threads 47 on the upper end of the handle 40. The hose in its stored position serves to close off the dispensing end of the hose and thus prevent volatile components from reaching the environment.

The top of the fill cap 22 is provided with the indicating arrangement shown in FIGS. 3 and 4, which consists of a pivotal arm 50, rotatable about a pivot pin 52, the path of the outer end of the arm being marked with graduations 53 in terms of fuel mixture ratio. Preferably, each such graduation is associated with a headed nub such as 54 extending upward from the top of the fill cap, and a corresponding central opening is provided on the outer end of the arm 50, so it can be snapped over selected nub corresponding to the mixture ratio of the fuel in the container. There is thereby provided a reliable, continuing indication of the fuel mixture ratio during storage of the container, so that when the container is used again it will only be used where such mixture ratio is appropriate.

Figure 6:
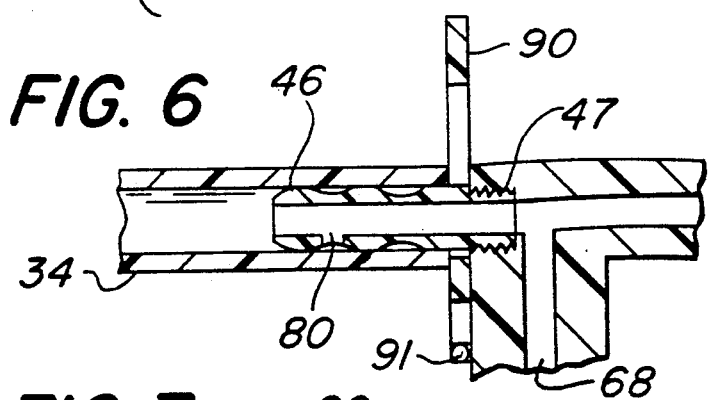
FIG. 6 is a sectional view taken along lines 6—6 of FIG. 5.
Figure 5:
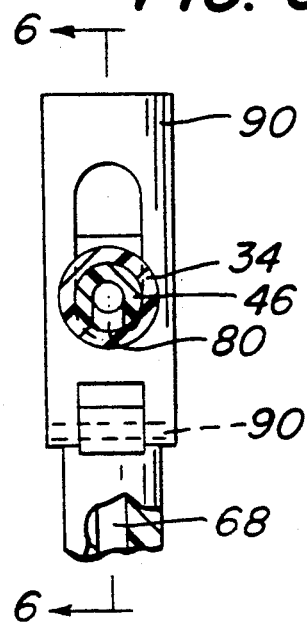
FIG. 5 is an enlarged fragmentary view taken along lines 5—5 of FIG. 2 of a pivotable lever mounted on the handle for enabling easy movement of the dispensing end of the hose along the vent fitting.
Figure 7:
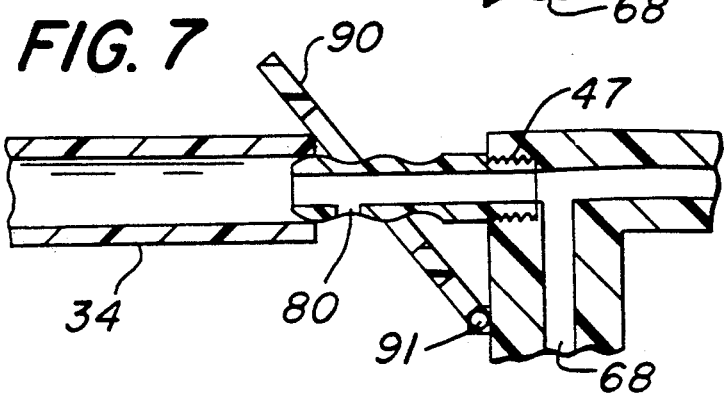
FIG. 7 is a view like FIG. 6 but, with the lever operated to move the dispensing end of the hose beyond the vent opening in the hose-receiving fitting.

Venting of the container during use is provided to enable smooth dispensing of fuel mixture through the hose. To accomplish this, vent openings 60 and 62 (FIG. 2) are provided in the upper portion of the container, communicating with passages 68 and 70, respectively, leading to a common passage 72 in hose-receiving fitting 46; passage 72 opens downwardly to atmosphere at atmospheric vent opening 80 on the underside of the fitting 46. This atmospheric vent opening is positioned sufficiently close to the distal end of the fitting that when the hose is placed in position over the fitting, it covers and closes off the downwardly-directed atmospheric vent opening as shown in FIG. 6. However, as the dispensing end of the hose is removed from the hose-receiving fitting 46, as shown in FIG. 7, the atmospheric vent opening is exposed to atmosphere before the hose is removed completely, thereby permitting the momentary discharge of any high-pressure volatile products in a direction away from the face of the carrier. The hose is then very easily removed, and thereafter the passages in the hose-receiving fitting serve to vent the container to atmosphere, so that air can enter the container behind the liquid being poured, and thus assure smooth pouring action.

An optional information tag 84 may be secured by an appropriate chain 86 to the handle 40, to provide a record of the use of the container.

In use then, one may for example fill the main body of the container 10 with gasoline to the level marked "One U.S. Gallon", and then fill the oil-measuring cup to the level which will produce the desired ratio of gasoline to oil; the contents of the cup are then dumped through the top fuel opening into the tank for mixture with the gasoline. The cap is then replaced and the ratio indicator arm 50 moved to the appropriate corresponding position to provide information as to the ratio of gasoline to oil in the container.

For subsequent storage, the dispensing end 39 of the hose is pushed over the free end of the fitting 46, thereby closing off the end of the hose and also blocking the atmospheric vent opening 80.

Mounted to the portion of handle 40 into which fitting 46 is screwed, is a hose-end release lever 90; it is pivotable about a horizontal pin 91 mounted on the handle. When the mixture is to be dispensed, one may seize the handle 40 and, with the back of the thumb, flick the lever 90 forwardly until the dispensing end 39 of the hose 34 is pushed along the fitting to the position shown in FIG. 7, in which position any volatile products under pressure in the container are released from the atmospheric vent opening 80 on the lower side of the nozzle. The free end of the flexible hose is then completely removed and placed into the fuel inlet of the engine tank, the container tipped, and the mixture thus dispensed to the extent desired. After this, the outlet end of the hose is pushed into place again over the fitting, which returns the lever to its upright position, and the entire assembly is then ready for storage until the next use.

While the invention has been described with respect to particular embodiments in the reference of complete definiteness, it will be understood that it may be embodied in a variety of forms differing substantially from those shown and described, without departing with the spirit and scope of the invention.

What is claimed is:

1. A container system for holding and dispensing an oil-gasoline fuel mixture, comprising:

a container for a gas-oil mixture having a fill opening, a separate dispensing opening and a separate container vent opening in the top thereof;

a flexible hose having one end which communicates with the interior of said container by way of said dispensing opening and having a dispensing end which is adapted for dispensing said mixture into a fuel tank;

a rigid carrying handle affixed to the top of said container;

said handle containing a handle passage extending along its length, said handle passage having a distal end and having a vent end, said vent end communicating with said container opening;

a hose-end receiving fitting mounted on said handle, said fitting for removably receiving and mounting said dispensing end of said hose when said hose is not in use, said fitting containing a longitudinal fitting passage, said fitting passage having a proximal end which communicates with said distal end of said handle passage, said fitting passage having a distal end in communication with the interior of said hose when said hose is mounted on said fitting, and said dispensing end of said hose being mountable on and removable from said fitting by mutual sliding motion of said dispensing end of said hose over a region of the exterior of said fitting;

said fitting having a sidewall and containing a fitting vent opening through said side wall in said region of the exterior of said fitting traversed by said dispensing end of said hose when said hose is being mounted upon or removed from said fitting, said fitting vent being in communication with said container vent opening, whereby said fitting vent opening is initially covered by said dispensing hose end but is uncovered as said dispensing hose end is being removed, wherein said container is vented to atmosphere before said hose is fully removed from said fitting.

2. The container system of claim 1, wherein said fitting vent opening is located in a down side of said fitting and from said container, to direct venting toward said container and away from the 3. The container of claim 2, comprising a digitally pivotal operating lever mounted between said distal end of said handle and the distal end of said fitting and pivotable by motion of a digit of the hand of a person holding said handle, through positions which cause said dispensing end of said hose to be pushed along said fitting past said fitting vent opening and then off said fitting.

4. The container system of claim 3, comprising a fuel cap for said fill opening, and comprising a hollow transparent oil-measuring cup dependent therefrom and marked with indicia indicating an amount of oil placed in said cup when said cap is removed, inverted and at least partially filled with oil.

5. The container system of claim 4, comprising a manually settable indicator of the proportion of oil and gas last placed in said container, said indicator being mounted on said fuel cap.

* * * * *